United States Patent
Kawano et al.

(10) Patent No.: US 6,444,366 B1
(45) Date of Patent: Sep. 3, 2002

(54) NON-SINTERED ELECTRODE AND METHOD OF MANUFACTURING SAME

(75) Inventors: Hiroshi Kawano, Ibaraki; Yoshio Moriwaki, Hirakata; Isao Matsumoto, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/700,716

(22) PCT Filed: May 31, 1999

(86) PCT No.: PCT/JP99/02908
§ 371 (c)(1),
(2), (4) Date: Nov. 28, 2000

(87) PCT Pub. No.: WO99/63608
PCT Pub. Date: Dec. 9, 1999

(30) Foreign Application Priority Data

May 29, 1998 (JP) .............................. 10-148528

(51) Int. Cl.[7] .............................. H01M 4/30; H01M 4/70
(52) U.S. Cl. .............................. 429/241; 29/2; 29/623.5
(58) Field of Search ..................... 29/2, 623.1, 623.5; 83/903; 429/218.2, 223, 233, 241

(56) References Cited

U.S. PATENT DOCUMENTS

| | | | |
|---|---|---|---|
| 4,105,832 A | * | 8/1978 | Sugalski ..................... 429/222 |
| 5,162,178 A | | 11/1992 | Ohsawa et al. |
| 5,543,250 A | | 8/1996 | Yanagihara et al. |
| 5,824,435 A | | 10/1998 | Kawano et al. |

FOREIGN PATENT DOCUMENTS

| | | |
|---|---|---|
| EP | 651451 | 5/1995 |
| EP | 750358 | 12/1996 |
| JP | 59130072 | 7/1984 |
| JP | 7-130370 | 5/1995 |
| JP | 7-201327 | 8/1995 |
| JP | 7-320735 | 12/1995 |
| JP | 7-335208 | 12/1995 |
| JP | 9-7603 | 1/1997 |
| WO | 98/15021 | 4/1998 |

OTHER PUBLICATIONS

English Language Abstract of JP–59–130072.
English Language Abstract of JP–7–335208.
English Language Abstract of JP–7–320735.
English Language Abstract of JP–7–201327.
English Language Abstract of JP–7–130370
English Language Abstract of JP9–7603.

* cited by examiner

Primary Examiner—Carol Chaney
Assistant Examiner—Susy Tsang-Foster
(74) Attorney, Agent, or Firm—Greenblum & Bernstein, P.L.C.

(57) ABSTRACT

A metal sheet (1) which constitutes a non-sintered type electrode support is processed to have minute irregularities on its surface. The irregularities are formed by a mechanical method such that protrusions (9) and indentations (8) are configured with a center-to-center pitch (P) in the range of from 50 to 300 $\mu$m and such that the apparent thickness after processing is at least three times as large as the unprocessed material thickness.

21 Claims, 6 Drawing Sheets

NON-SINTERED ELECTRODE AND METHOD OF MANUFACTURING SAME

TECHNICAL FIELD

The present invention relates to a non-sintered type electrode for use in storage batteries (secondary batteries), such as alkaline storage battery, lithium ion storage battery and polymer lithium storage battery.

BACKGROUND ART

Various types of electrodes are known for the storage battery (secondary battery). Non-sintered electrodes are defined to be the electrodes that can be obtained without sintering and are fabricated by coating or pressing an active material for battery or active material retaining medium onto an electrode support.

The process of fabricating a nickel positive electrode of alkaline storage battery as one example of sintered electrodes is described below. A microporous sintered plaque obtained by sintering nickel powder is impregnated with an aqueous solution of nickel nitrate or the like thereby to add nickel salt, and, after drying, the sintered plaque is immersed in caustic alkali aqueous solution to convert the nickel salt to nickel hydroxide. This method has the disadvantage that the process is complicated and the filling density of nickel hydroxide as an active material is reduced in comparison with the non-sintered electrode described later. In spite of this disadvantage, this electrode has an excellent high-rate discharge characteristic and a long cycle life, and finds wide application in a variety of field.

A method called pocket system was previously used for the manufacture of non-sintered electrode, while paste applying or pressing methods have become the mainstream in the recent years. In the paste applying method, the active material for battery itself or active material retaining medium is prepared into a paste with water or an organic solution, this paste is applied on an electrode support and dried. In the pressing method, on the other hand, the active material for battery or active material retaining medium in the form of powder directly fills the electrode support by being pressed thereonto with a press machine or the like.

A variety of materials are used for these non-sintered electrodes, including metal foil, perforated metal plate, metal net, expanded metal, foamed porous metal material and the like. These materials have been applied with their properties and forms varied-accordingly so as to suit each battery system.

For example, foamed nickel porous material having a three dimensionally reticulated structure has been commonly used as the electrode support for the positive electrode of non-sintered type used in alkaline storage batteries such as nickel-hydrogen storage battery or nickel-cadmium storage battery. For the negative electrode, on the other hand, punched metal has been mainly employed.

The method using foamed nickel porous material is a simple method of electrode production. Further, the availability of a foamed nickel porous material of high porosity makes it possible to fill it with nickel hydroxide to a high density and therefore a high-capacity battery can be produced. The foamed nickel porous material, however, needs to be produced by electroplating and therefore has the disadvantage of high material cost.

In view of this, a non-sintered electrode is under development using a low-cost punched metal or expanded metal in place of the foamed nickel porous material as an electrode support. These electrode supports have no three-dimensional structure unlike the sintered plaque or the foamed-nickel porous material. As a result, an electrode made of these electrode supports has a low ability to hold an active material and the active material is liable to fall off during electrode fabrication or repeated charging and discharging. Further, due to the low electronic conductivity in the electrode thickness direction and a poor electrode characteristic, which is a serious hindrance to the application in the nickel positive electrode of alkaline storage battery, these electrode supports find no practical applications except for special types of electrodes.

Japanese Laid-Open Patent Application No.7-130370 and No.9-7603 disclose technologies for improvement of these electrode supports. The electrode support according to JP Laid-Open No.7-130370 is constructed of flat metal sheet or flat metal foil and thus is weak in the adhesion between the active material layer and electrode support. Separation of active material from electrode support occurs particularly in the application as the electrode of a storage battery due to changes in volume of the active material caused by repeated charging and discharging. Current collecting ability decreases accordingly, as a result of which the battery characteristics are deteriorated.

As a countermeasure for this drawback, formation of minute irregularities using metal powder is proposed in JP Laid-Open No.9-7603. The adhesion between the active material layer and the electrode support is thereby improved. However, the production cost of electrode supports will be raised because of sintering in an inactive gas atmosphere or electroplating methods required for forming the minute irregularities layer.

In both of the above electrode supports, furthermore, in the case of corrugating the electrode supports so that they have a three-dimensional structure, they are more subjected to deformation and elongation during the compressing process for filling the active material at a high density. As a result, cracks or rupture occur in the electrode support, which leads to troubles such as decrease in current collecting ability of the electrode and micro-short circuit when assembled as a battery. Moreover, the above mentioned deformation and elongation of the electrode support also set a limit to the high-density filling and a battery of large discharge capacity cannot be obtained.

Meanwhile, efforts have been made to improve the electrode characteristics such as retaining property of active material and electronic conductivity for the negative electrode of alkaline storage battery (cadmium electrode or hydrogen-absorption alloy electrode), using inexpensive punched metal or expanded metal while exploiting their advantages. Further improvement is desired to achieve a more efficient high-rate discharge characteristic and a longer cycle life, which are still unsatisfactory in these negative electrodes.

These demands are also applicable to other types of batteries such as for example lithium ion storage battery or polymer lithium storage battery. There has generally been a desire for an electrode using a low cost electrode support while exhibiting excellent performance.

The above-mentioned method of electrode production using a punched metal or expanded metal as an-electrode support has the advantage that a powder of active material made into a paste with a solution of a high polymer binder and a conductive powder is coated and dried on the electrode support and thus the electrode can be easily produced. The adhesion between the metal substrate acting as the electrode support and the active material layer is generally weak so that the active material is liable to peel off from the metal substrate in an application using the electrode for batteries. In the case where the electrode support acts as a current collector, the electrical resistance of the electrode increases thereby causing a reduced discharge voltage and discharge capacity. In order to solve this problem, adding a great amount of binder to the active material layer suppresses the separation. The resultant reduced reactivity of the active material, however, has an adverse effect on the discharge characteristic.

In a method for strengthening the adhesion between the electrode support and the active material layer, a thermoplastic resin layer functioning as a binder is formed on the surface of the electrode support. Then, the active material is coated on the thermoplastic resin layer and the electrode is heated, to improve the adhesion between the electrode support and the active material layer. This method, however, has a disadvantage that a resin insulating layer is formed between the metal electrode support and the active material layer with the result that the current collecting characteristic of the electrode is reduced, thereby reducing the reactivity of the electrode.

As described above, these problems are difficult to solve when a comparatively flat metal substrate-is used as an electrode support.

Accordingly, an object of the present invention is to provide all improvement in a non-sintered type electrode with an active material or active material retaining medium coated or pressed on an electrode support, in order to achieve an improved adhesion and improved electronic conductivity between the active material layer and the electrode support, while maintaining the advantage of low material cost.

Another object of the present invention is to provide an improved non-sintered electrode which is favorably used as the nickel electrode of alkaline storage batteries such as nickel hydrogen storage battery and nickel-cadmium storage battery, the hydrogen-absorption alloy electrode which uses hydrogen-absorption alloy powder, and the cadmium electrode, as well as for the electrodes of lithium ion storage battery and polymer lithium storage battery.

DISCLOSURE OF THE INVENTIOIN

In order to achieve the above objects, the present invention provides a non-sintered type electrode comprising an electrode support made of a metal sheet having minute surface irregularities on which is coated or pressed an active material for battery or an active material retaining medium, characterized in that said surface irregularities are formed by a mechanical method such that protrusions and indentations are configured with a center-to-center pitch in the range of from 50 to 300 $\mu$m, and such that the apparent thickness after forming the surface irregularities is at least three times as large as the thickness before the formation of the surface irregularities.

The protrusions and indentations should preferably be formed in a substantially tapered shape such as conical shape, but may also be formed in hemispheric shape.

The apparent thickness of the electrode support after forming the surface irregularities should preferably be 200 $\mu$m or more and in particular 400 $\mu$m or more, and should be at least five times as large as the thickness before the formation of the surface irregularities.

The electrode support may be constructed of a punched metal or a non-punched metal sheet, of which material thickness before the formation of the surface irregularities should preferably be in the range of from 10 to 80 $\mu$m and in particular from 20 to 60 $\mu$m. The electrode support should preferably be made of nickel sheet, but may be also constructed of steel sheet or nickel-plated steel sheet.

The center-to-center pitch of the protrusions and indentations should preferably be in the range of from 50 to 300 $\mu$m, and in particular 100 to 200 $\mu$m.

In addition to the above construction, it is preferable that the metal sheet with the surface irregularities has innumerable minute holes formed by piercing through the tops of the protrusions. In particular, it is preferable to construct the electrode support by forming such minute holes in a non-punched metal sheet.

The protrusions and indentations of the surface irregularities should preferably be formed either at random or in order with the respective numbers of protrusions and indentations in ranges of from 80 to 20% and from 20 to 80% per unit area. The arrangement of the protrusions and indentations may be such that they are formed alternately in one direction or in both longitudinal and transverse directions.

Owing to the above construction, the electrode support according to the present invention has an advantageous feature of low manufacturing cost, since it can be fabricated simply by a mechanical method just like common punched metal which is obtained from a nickel-plated steel sheet by a mechanical process. In addition to this, the electrode support of the present invention is formed with minute surface irregularities with the center-to-center pitch between adjacent protrusions and indentations in the range of from 50 to 300 $\mu$m, whereby the apparent thickness of the electrode support is increased to at least three times as large as the unprocessed material thickness. Thanks to this drastic transformation of the structure into three-dimensional form, the active material retaining ability of the electrode support is remarkably improved owing to the minute surface irregularities, and separation of the active material layer from the electrode support is suppressed in comparison with a two-dimensional electrode support such as punched metal. The electronic conductivity in the electrode thickness direction is also enhanced. The utilization rate of active material is accordingly increased, whereby the battery of higher capacity can be obtained.

There might have been a trouble that such machining process causes the tensile strength of the electrode support to decrease and that the yield of product is reduced accordingly, but this problem was avoided by providing a strip-form solid portion in the electrode support where no punched holes or irregularities are provided.

The electrode support according to the present invention as described above can constitute a non-sintered electrode of excellent quality. Specifically, the above technologies can be applied for the fabrication of a nickel positive electrode of an alkaline storage battery. In that case, the active material should preferably comprise nickel hydroxide powder of which surface is coated with cobalt oxide of higher order at the rate of 2 to 10 wt % in relation to 100 wt % of nickel hydroxide, or alternatively, cobalt oxide of higher order or nickel may be mixed in the nickel hydroxide powder. In the case where the cobalt oxide of higher order is solely used, it should be contained at the rate of 2 to 10 wt % in relation to 100 wt % of nickel hydroxide, whereas if nickel is solely used, it should be contained at the rate of 10 to 25 wt % in relation to 100 wt % of nickel hydroxide. A nickel positive electrode of extremely high utilization rate can be thereby obtained.

Furthermore, the above technologies can be also applied for the fabrication of a hydrogen-absorption alloy negative electrode of an alkaline storage battery. In that case, the active material retaining medium may comprise hydrogen-absorption alloy powder alone, or a conductive agent selected from nickel, copper, and carbon, may be contained therein at the rate of 0.5 to 10 wt % in relation to 100 wt % of hydrogen-absorption alloy powder. Such nickel or copper may be coated on the surface of the hydrogen-absorption alloy powder in the same amount as mentioned above. A hydrogen-absorption alloy negative electrode of extremely high utilization rate and excellent high-rate discharge characteristic can be thereby obtained.

It is also possible to apply the electrode support of the present invention to a lithium ion storage battery or lithium polymer storage battery, and to improve the electrode characteristics thereof by selecting the materials appropriately.

The present invention also provides, in order to achieve the above said objects, a method of manufacturing a non-sintered type electrode characterized in that minute irregularities are formed on the surface of a metal sheet by press-machining using metal molds such that protrusions and indentations are configured with a center-to-center pitch in the range of from 50 to 300 $\mu$m and such that the apparent thickness after forming the surface irregularities is at least three times as large as the thickness before the formation of the surface irregularities, thereby fabricating an electrode support, and an active material for battery or an active material retaining medium is coated or pressed on the surface of the thus obtained electrode support.

In the above process of press-machining the metal sheet with metal molds, minute holes should preferably be formed simultaneously with the formation of the surface irregularities by piercing through the tops of the protrusions. Also, it is preferable that each of the protrusions and indentations is formed in a substantially tapered shape.

DESCRIPTION OF THE DRAWINGS

FIGS. 2A and 2B are cross sectional views illustrating a rolled steel sheet fabricated using the metal molds of FIG. 1, wherein FIG. 2A shows the case where protrusions and indentations are formed, and FIG. 2B shows the case where the rolled steel sheet of FIG. 2A has been further pressed by the molds until the protrusions and indentations are pierced through;

BEST MODE FOR CARRYING OUT THE INVENTION

Preferred embodiments of the present invention in the form of specific examples are hereinafter described with reference to the accompanying drawings.

EXAMPLE 1

Figure 1:
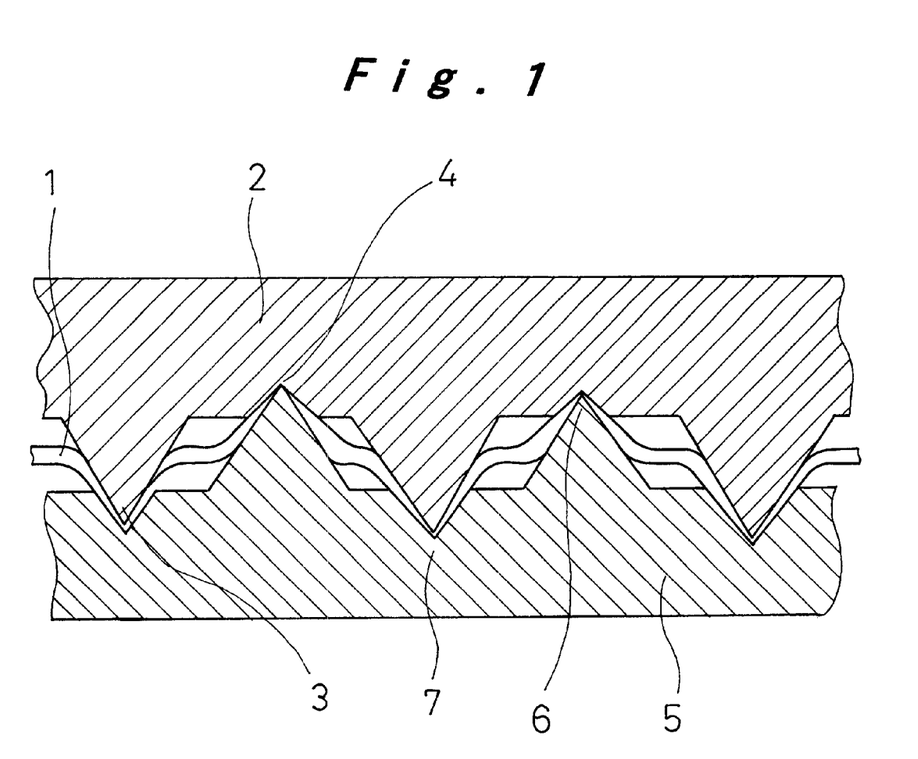
FIG. 1 is a cross sectional view showing one example of metal molds for fabricating the electrode support according to one embodiment of the present invention.

A rolled steel sheet (SPCE) having a thickness of 50 $\mu$m of which surface is plated with nickel to the thickness of 2~3 $\mu$m was used. FIG. 1 is a longitudinal sectional view showing a construction of a mold used for forming minute irregularities in the metal sheet to be used as the electrode support. An upper mold 2 has pointed projections 3 of cone shape and recesses 4 corresponding to projections formed on a lower mold 5, which comprises projections 6 and recesses 7 similarly to the upper mold 2. Reference numeral 1 represents the rolled steel sheet.

The rolled steel sheet 1 is arranged between the molds such as to be fixed in position at its periphery. When the upper mold 2 and lower mold 5 are pushed together, the rolled steel sheet 1 is stretched by means of the projections and recesses of the molds. If the molds are further pressed to each other, the rolled steel sheet 1 will be perforated. It is thus possible to adjust as required the rate of stretch, the shape of punched-out holes and the rate of perforation, by varying the configuration of the upper and lower molds or the distance of the molds pressed against to each other.

Figure 2A:
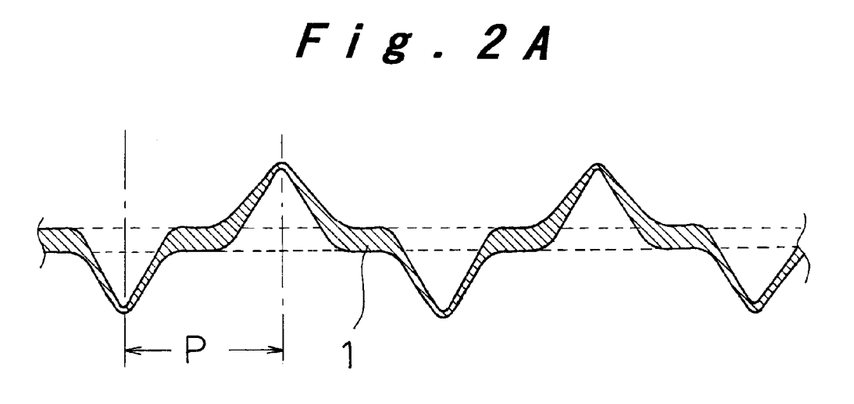
Figure 2B:
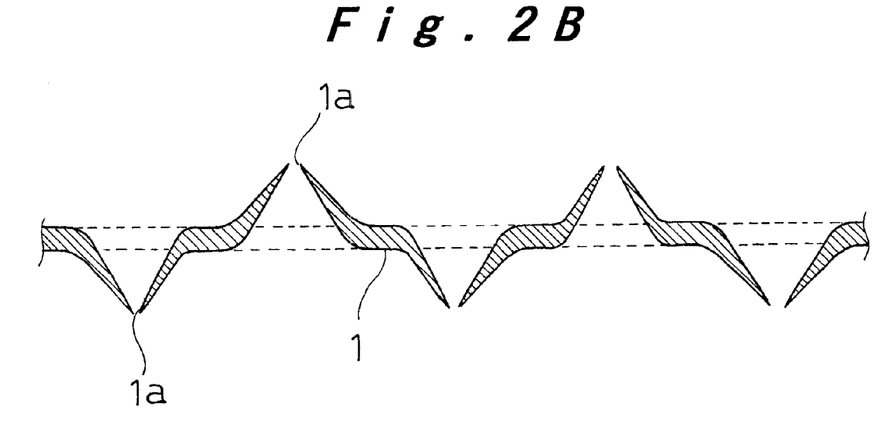

FIG. 2 is a cross sectional view showing a rolled steel sheet after being processed using the above molds. FIG. 2A shows the case where no holes have been made, whereas in FIG. 2B, holes 1a have been formed.

Figure 3:
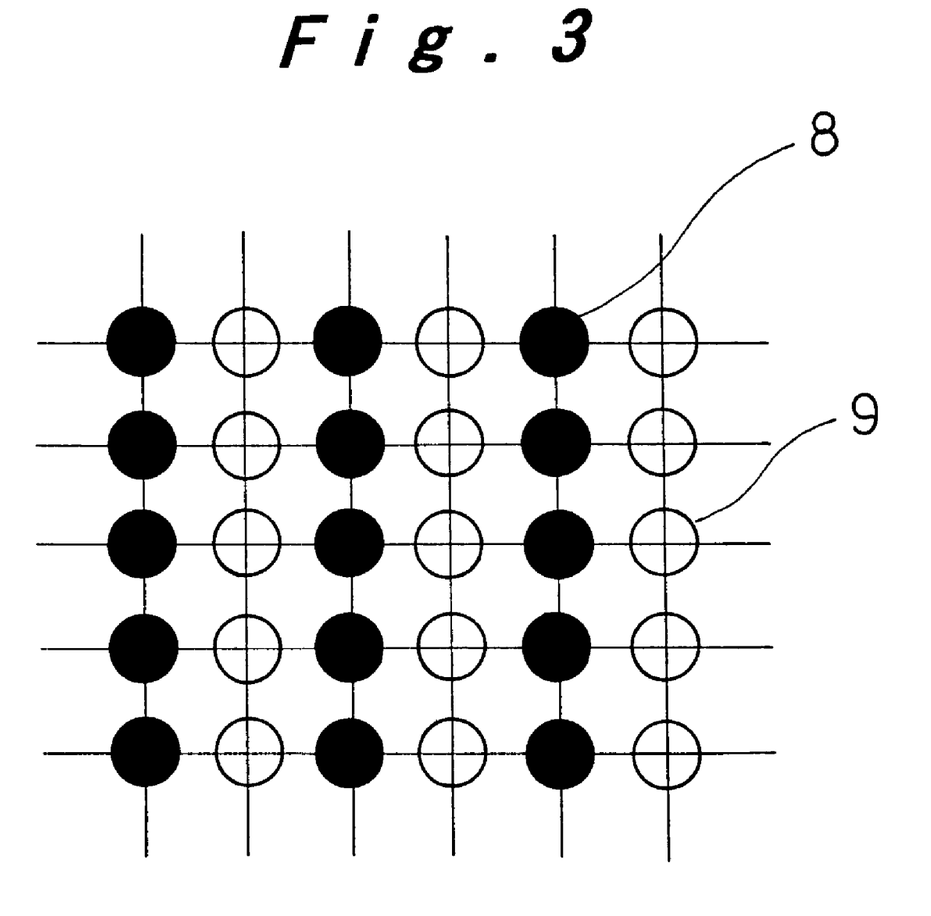
FIG. 3 is a top plan view illustrating a rolled steel sheet wherein protrusions and indentations have been formed in rows.
Figure 4:
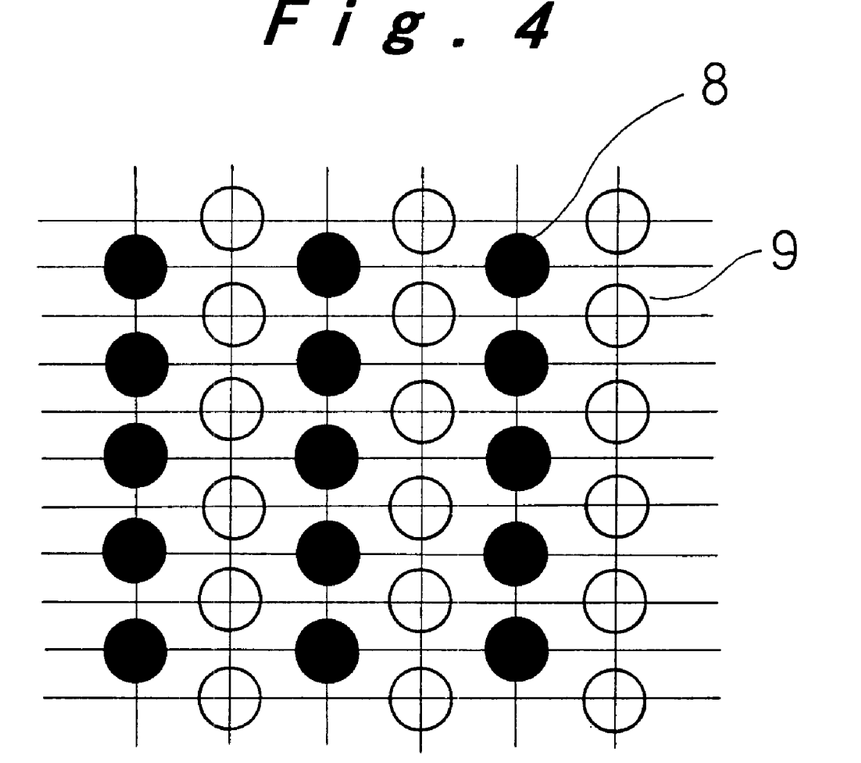
FIG. 4 is a top plan view illustrating a rolled steel sheet wherein protrusions and indentations have been formed in a zigzag fashion.

Using various molds respectively having different center-to-center pitches (P shown in FIG. 2A), perforated metal sheets of three-dimensional structure having innumerable minute holes 1a a~e were produced, their inter-hole pitches ranging from 50~400 $\mu$m. There was no conspicuous difference in the performance of electrodes between the metal sheets processed to have surface irregularities without holes 1a and those with the holes 1a. The metal sheets with minute holes 1a were used as samples in the experiments described later. The pattern of protrusions and indentations was such that the central points of the protrusions and indentations were arranged in one line in a longitudinal direction as shown in FIGS. 3 and 4. The metal sheet was successively processed from left to right in a lengthwise direction of the strip of metal sheet, the reference numeral 8 in FIG. 3 representing indentations formed by pressing the metal sheet downwards, and 9 showing protrusions formed by upward pressing.

All of the perforated metal sheets a~e were produced with the pattern shown in FIG. 3. Comparative sample c' was also prepared, of which P is the same 200 $\mu$m as that of the perforated metal sheet c, with the pattern shown in FIG. 4, wherein center points of adjacent protrusions and indentations are offset to each other in a transverse direction.

Formation of protrusions and indentations with P of less than 50 $\mu$m will necessitate micro-machining of the molds, which leads to high production cost. Moreover, the apparent thickness will not be sufficiently increased by the formation of irregularities. In order to achieve effectively the benefits of the present invention, which is the provision of an electrode support with enhanced conductivity in the thickness direction at low cost, the inter-hole pitch should be greater than 50 $\mu$m.

Furthermore, a normal punched metal obtained by punching holes of the diameter of 1.2 mm in a nickel-plated rolled steel sheet having a thickness of 80 $\mu$m with the center-to-center distance between adjacent holes of 2.4 mm, was pressed with the molds of FIG. 1 thereby to obtain a perforated metal sheet f with protrusions and indentations in the arrangement shown in FIG. 3 with the inter-hole pitch of 100 $\mu$m. This perforated metal sheet f and a normal punched metal g without surface irregularities were used for the evaluation of electrodes described later.

Nickel-plated rolled steel sheets having a thickness ranging from 10 to 100 μm were pressed with the same molds as those used for producing the above metal sheet c to obtain metal sheets h~l as the comparative examples with respect to the metal sheets having the thickness of 50 μm before processing, thereby to analyze how the metal sheet thickness before processing affects the performance of battery.

Figure 5:
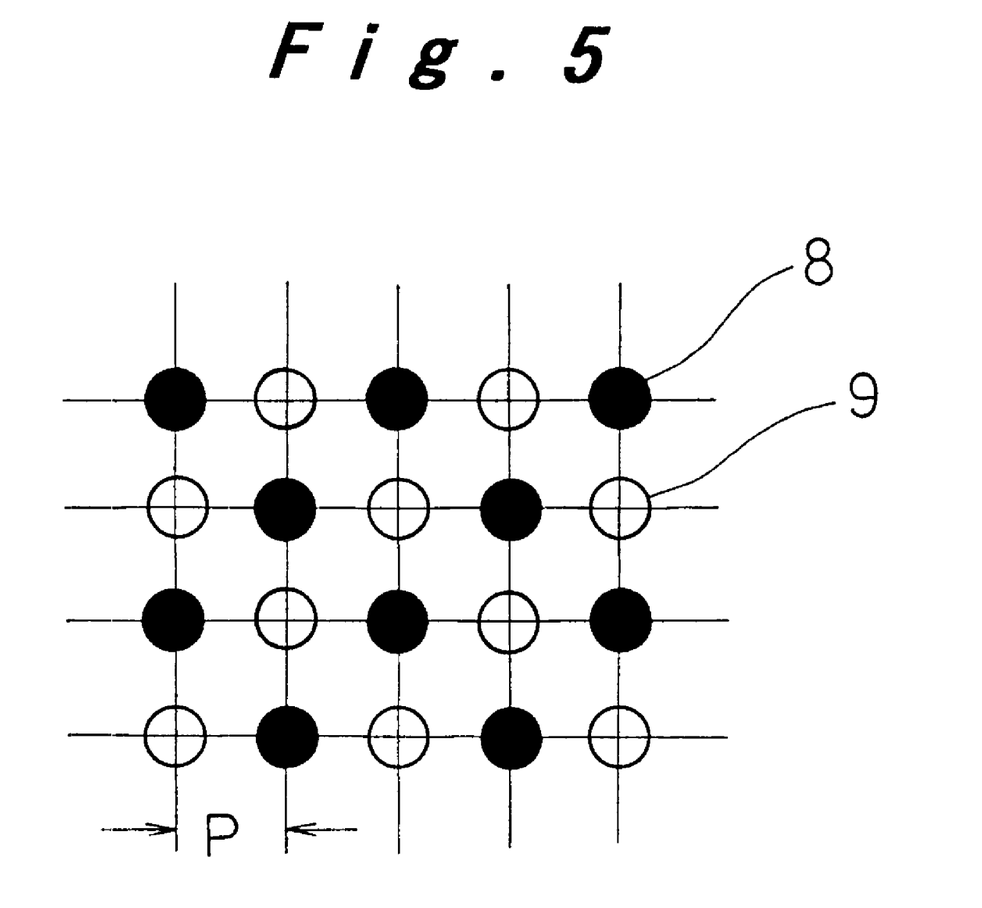
FIG. 5 is a top plan view illustrating a rolled steel sheet wherein protrusions and indentations have been formed alternately in rows.

Furthermore, a nickel-plated rolled steel sheet of which raw material thickness is 50 μm was formed with protrusions and indentations in a pattern shown in FIG. 5, wherein protrusions and indentations are alternately formed in both longitudinal and transverse directions, with the inter-hole pitch P of the same 200 μm as that of metal sheet c, thereby obtaining a perforated metal sheet m. Similarly, a perforated metal sheet n was produced with the pattern shown in FIG. 6.

Besides, a metal sheet of pure nickel having a thickness of 50 μm was pressed with the molds of FIG. 1 in the pattern of FIG. 3 with the inter-hole pitch of 200 μm, so as to obtain a perforated metal sheet o.

The specification of these electrode supports is summarized in Table 1.

TABLE 1

Figure 6:
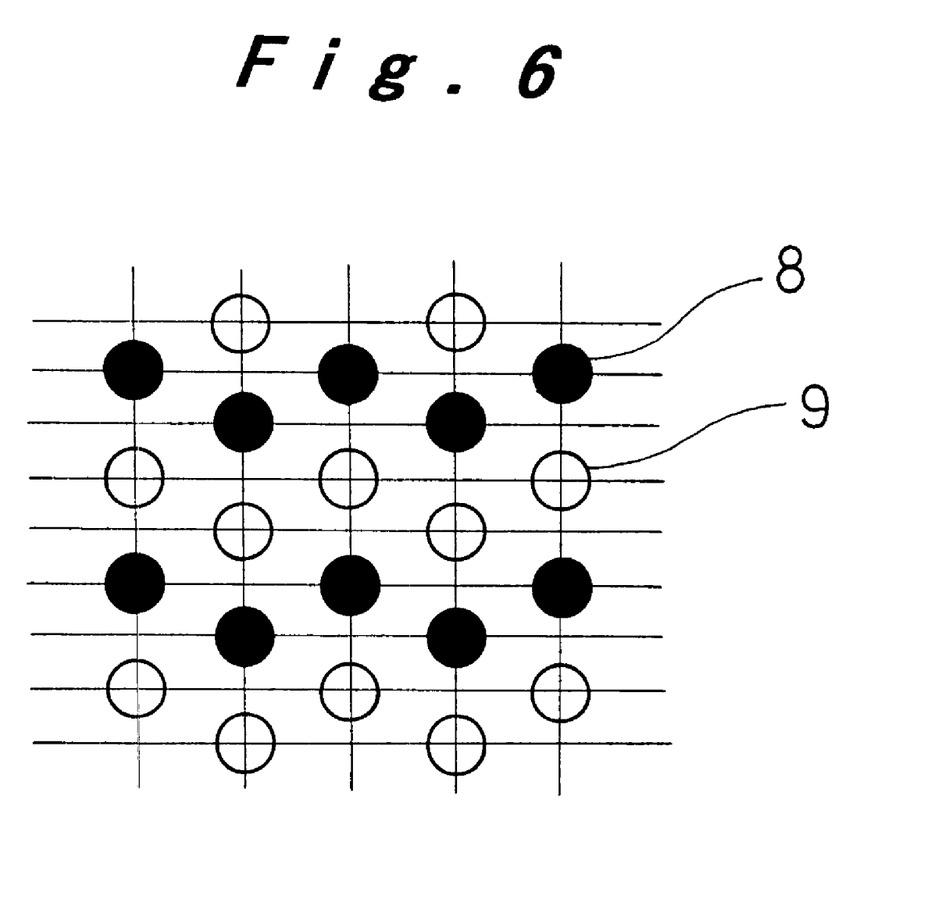
FIG. 6 is a top plan view illustrating a rolled steel sheet wherein protrusions and indentations have been formed alternately in a zigzag fashion.

| Perforated metal sheet | Raw material thickness (μm) | Material | Inter-hole Pitch (P) (im) | Punched holes | Apparent thickness after processing (μn) | Remarks |
|---|---|---|---|---|---|---|
| a | 50 | Nickel-plated rolled steel | 50 | Absent | 250 | |
| b | 50 | ditto | 100 | ditto | 400 | |
| c | 50 | ditto | 200 | ditto | 500 | |
| c' | 50 | ditto | 200 | dittb | 500 | |
| d | 50 | ditto | 300 | ditto | 500 | |
| e | 50 | ditto | 400 | ditto | 500 | |
| f | 80 | ditto | 100 | Present | 400 | |
| g | 80 | ditto | — | Present | (80) | Normal product |
| h | 10 | ditto | 200 | | 500 | |
| i | 30 | ditto | 200 | ditto | 500 | |
| j | 60 | ditto | 200 | ditto | 500 | |
| k | 80 | ditto | 200 | ditto | 500 | |
| l | 100 | ditto | 200 | ditto | 500 | |
| m | 50 | ditto | 200 | ditto | 500 | FIG. 5 |
| n | 50 | ditto | 200 | ditto | 500 | FIG. 6 |
| o | 50 | Pure nickel | 200 | ditto | 500 | |

These perforated metal sheets a~o were used to prepare paste-coated type nickel positive electrodes.

First, 100 g of nickel hydroxide powder were mixed into a paste form with 10 g of cobalt powder, 55 g of 3 wt % aqueous solution of carboxymethyl cellulose and 5 g of 48 wt % styrene-butadiene rubber aqueous dispersion. Each perforated metal sheet shown in Table 1 was passed through a bath containing this paste to coat the paste on both faces of the perforate metal sheet. The coated perforated metal sheets were then passed through a stainless-steel slit to reduce them to a predetermined thickness. Then the metal sheets were dried and compressed to prepare a coated-nickel positive electrode having a thickness of from 0.63 mm to 0.65 mm.

Next, these nickel electrodes were cut into rectangles (i.e., 38 mm×220 mm), and their weights were measured. The electrochemical theoretical capacity calculated from the amount of nickel hydroxide contained in the electrode thus obtained was in the range of from 2674 mAh to 3092 mAh.

Each of these nickel positive electrodes was combined with a well-known rare earth-nickel based hydrogen-absorption alloy negative electrode and a separator made of unwoven fabric of polypropylene processed to acquire hydrophilicity to configure a cylindrical sealed battery (size C) having a nominal capacity of 2.8 Ah. An aqueous solution of potassium hydroxide (3 wt %) dissolved with lithium hydroxide 30 g/l was used in an amount of 6 ml per cell as the electrolyte.

Batteries A~O using the nickel positive electrodes obtained respectively from the perforated metal sheets a~o shown in Table 1 were thus prepared.

The batteries constructed as described above were charged for 15 hours at 0.1C., and left for one hour and thereafter discharged at 0.2C. until the battery voltage decreased to 1.0V. Three cycles of this test were repeated under the same conditions. Next, under similar charging conditions, the fourth-cycle test was conducted with a discharge current of 0.5C., and the fifth-cycle test was conducted with a discharge current of 1C., to compare the discharge characteristics. Also, for the sixth and subsequent cycles, the cycle life test was conducted by charging at 0.3C. for four hours and discharging at 0.5C. until the battery voltage decreased to 1V to compare the structure of the nickel positive electrode and the cycle life characteristics. The results are shown in Table 2.

TABLE 2

| Battery | Theoretical capacity (mAh) | Utilization of active material at 3rd cycle (%) | Discharge capacity at 5th cycle (mAh) | Discharge capacity at 100th cycle (mAh) | Discharge capacity at 300th cycle (mAh) |
|---|---|---|---|---|---|
| A | 2870 | 97.4 | 2516 | 2063 | 1762 |
| B | 2883 | 97.5 | 2586 | 2483 | 2276 |
| C | 2902 | 98.0 | 2645 | 2486 | 2195 |
| C' | 2898 | 98.0 | 2649 | 2503 | 2219 |
| D | 2914 | 95.8 | 2540 | 1981 | 1524 |
| E | 2933 | 92.1 | 2296 | 1492 | 1148 |
| F | 2950 | 97.8 | 2655 | 2575 | 2390 |
| G | 2965 | 85.1 | 2283 | 1096 | 753 |
| H | 3092 | 95.3 | 2659 | 2420 | 1912 |
| I | 3028 | 96.8 | 2634 | 2423 | 2134 |
| J | 2862 | 98.1 | 2633 | 2448 | 2185 |
| K | 2793 | 98.0 | 2570 | 2313 | 1953 |
| L | 2674 | 98.3 | 2460 | 2165 | 1673 |
| M | 2913 | 99.8 | 2680 | 2573 | 2278 |
| N | 2901 | 101.1 | 2669 | 2602 | 2322 |
| O | 2927 | 98.8 | 2722 | 2586 | 2286 |

In comparing the charge and discharge characteristics of batteries A~E shown in Table 2, it was found that the utilization of the active material could be made more than 95% if the inter-hole pitch P was in the range of 50~300 μm, and that there was a trend of decline in the utilization when the P was greater than 300 μm. It is assumed that a smaller P will generally help enhance the electronic conductivity between the active material and the electrode substrate and thus will cause the utilization to increase. The effects of smaller P were also found in the large-current discharge characteristic at the 5th cycle. The result of the cycle life test also showed that the electrode supports with P in the above mentioned range have a longer life. The effects were remarkable especially in the batteries B and C, of which P were 100 μm and 200 μm, respectively.

In battery F, an electrode support obtained by providing surface irregularities according to the present invention to a normal punched metal was used with the same P as that of the electrode support of battery B. From the fact that, as compared with battery B, the effects of the present invention were recognized in battery F, too, it is seen that the same effects can be achieved by providing surface irregularities in a normal punched metal.

In battery G, on the other hand, wherein the electrode support g of punched metal with no surface irregularities constitute the electrode, the utilization of the active material and cycle life characteristic were extremely low. It is thus construed that providing the electrode support with a three-dimensional structure by forming minute protrusions and indentations on the surface of electrode support is effective to increase the electronic conductivity in the thickness direction of theelectrode and the retaining ability of the active material, and thus to enhance the performance of electrode. The separation of the active material from the electrode support is caused by generation of oxygen gas from the positive electrode under an overcharged state and the change in volume of the active material due to charging and discharging. The longer cycle life of battery observed in the above test can be particularly attributed to the fact that the active material did not easily peel off from the electrode support.

As set forth above, electrodes of high performance can be obtained by forming minute protrusions and indentations on the surface of metal sheet, since this causes the contact area with the active material to increase, and the active material retaining ability of the electrode support to improve.

Meanwhile, it is seen from the comparison between batteries A and B that the apparent thickness of metal sheets after processing should be three times as large as the thickness before processing and more than 200 $\mu$m (preferably five times as large and more than 400 $\mu$m) to achieve the effects of longer life.

With respect to batteries H~L using the electrode supports which were prepared by pressing nickel-plated rolled steel sheets having a thickness ranging from 10 to 100 $\mu$m with a fixed inter-hole pitch (P) of 200 $\mu$m for the purpose of analyzing the influence of thickness of unprocessed metal sheet, when compared with battery C, the utilization of the active material and large-current discharge characteristic were both improved in the case where the nickel-plated rolled steel before processing was of the thickness of 50~60 $\mu$m or more. In the cycle life characteristic, on the other hand, the peak value appeared in the case where the thickness of unprocessed metal sheet was more or less 50 $\mu$m. This has the following explanation. In the case wherein the raw material was thin, the battery could not exhibit a sufficient electronic conductivity, since the electrode support acts as a current collector. In the case where the raw material was thick, on the other hand, due to the increased strength of the electrode support itself, when wound into a cylindrical form to constitute a battery, there occurred distortion in the active material layer and electrode support, whereby the active material became more liable to peel off caused by repeated charging and discharging. Greater material thickness also causes reduced theoretical discharge capacity as can be seen from Table 2, which is a drawback to constitute a battery of high energy density. Consequently, the thickness of unprocessed metal sheet should be 80 $\mu$m or less in order to fully achieve the effects of the present invention.

There was no conspicuous difference between battery C in which the pattern of forming protrusions and indentations was changed and batteries M, N in the charge and discharge characteristics. This indicates that any of the patterns is effective. It may be said, though, only in close comparison between the differences of the patterns, that the patterns wherein protrusions and indentations are arranged alternately in both longitudinal and transverse directions are better, from the fact that the utilization rate of the active material in batteries M, N was greater. As for the material of metal sheets, similar effects were found in battery O using an electrode support made of pure nickel plate to those of other examples made of nickel-plated rolled steel sheet.

As described above, with the present invention, the battery characteristics of a coated type nickel positive electrode can be satisfactorily improved. The electrode support according to the present invention can be produced at lower cost by mechanically forming surface irregularities in a metal sheet or a punched metal sheet. The cost for electrodes. can be thus reduced, and batteries can be manufactured at lower cost.

EXAMPLE 2

The effects of conductive agent were compared in the coated type nickel positive electrode similarly to Example 1, using the electrode support c shown in Table 1 of Example 1. As the conductive agent, the effect of adding cobalt oxide of higher order and nickel powder, and the effect of coating cobalt oxide of higher order on the surface of nickel hydroxide powder constituting the active material were examined.

A paste mainly composed of active material was prepared in a similar way to that in Example 1 without adding cobalt powder, and was coated on the electrode support c. The electrode support c was then dried, compressed, and cut into the same dimensions to produce a coated nickel positive electrode for constituting a sealed battery of size C.

These nickel positive electrodes were combined with well-known hydrogen-absorption alloy negative electrodes to configure fifteen types of batteries P-1~T-1, P-2~T-2, U-1U~5 in a similar way as shown in Example 1, and charge/discharge test was conducted under the same conditions.

Table 3 shows the discharge capacity at 3rd cycle, utilization rate of active material (discharged at 0.2C.), theoretical discharge capacity of nickel positive electrode, and filling density calculated from the volume of the electrode of these batteries after charging and discharging.

Cobalt oxide of higher order was either coated on the surface of nickel hydroxide or simply added during preparation of the paste with the amount varied. Nickel powder was added in the paste, with its amount varied in each case. The amount of addition is indicated by the quantity in relation to 100 wt % of nickel hydroxide in Table 3.

TABLE 3

| Battery | Conductive agent | Amount of addition coated on active material | Amount of addition mixed in paste | Filling density of active material (mAh/cc) | Discharge at 3rd cycle Discharge capacity (mAh) | Utilization rate (%) |
|---|---|---|---|---|---|---|
| P-1 | Cobalt oxide of higher order | 0 | — | 642 | 2549 | 74.2 |
| Q-1 | ditto | 2 | — | 625 | 3087 | 92.3 |
| R-1 | ditto | 5 | — | 600 | 3184 | 99.2 |
| S-1 | ditto | 10 | — | 558 | 3078 | 103.1 |

TABLE 3-continued

| Battery | Conductive agent | Amount of addition coated on active material | Amount of addition mixed in paste | Filling density of active material (mAh/cc) | Discharge at 3rd cycle Discharge capacity (mAh) | Utilization rate (%) |
|---|---|---|---|---|---|---|
| T-1 | ditto | 15 | — | 513 | 2877 | 104.8 |
| P-2 | ditto | — | 0 | 669 | 2482 | 70.3 |
| Q-2 | ditto | — | 2 | 646 | 3138 | 90.8 |
| R-2 | ditto | — | 5 | 612 | 3202 | 97.8 |
| S-2 | ditto | — | 10 | 565 | 2971 | 98.8 |
| T-2 | ditto | — | 15 | 518 | 2752 | 99.3 |
| U-1 | Nickel powder | — | 5 | 630 | 2646 | 78.5 |
| U-2 | ditto | — | 10 | 598 | 2921 | 91.3 |
| U-3 | ditto | — | 20 | 567 | 2921 | 96.3 |
| U-4 | ditto | — | 25 | 535 | 2782 | 97.2 |
| U-5 | ditto | — | 30 | 503 | 2621 | 97.4 |

With respect to batteries P-1 to T-1 wherein the conductive high-order cobalt oxide powder is formed on the surface of nickel hydroxide, the less the amount of addition of high-order cobalt oxide powder was, the greater the filling density of active material was, while the utilization of active material decreased in accordance therewith. This indicates that the amount of cobalt oxide of higher order should be at least 2 or more in relation to 100 wt % of nickel hydroxide, in order to constitute a battery of high energy density. In battery T-1 wherein the amount of addition of cobalt oxide of higher order was 15 wt %, while the utilization increased, the filling density was reduced, as a result of which the discharge capacity decreased. It is thus preferable to set the amount of addition of cobalt oxide of higher order at 10 or less, since the use of relatively expensive cobalt oxide of higher order in a great amount will lead to the increase in production cost of electrodes.

The similar trend was observed in batteries P-2~T-2 wherein the conductive agent was added in the paste and in batteries U-1~U-5 wherein nickel powder was used as the conductive agent in terms of filling density and utilization rate of active material. It is thus assumed that the amount of addition of cobalt oxide of higher order is most preferably within the range 2~10 wt % in relation to 100 wt % of nickel hydroxide, and that of nickel powder is within the range 10~25 wt %.

As described above, the same effects were obtained in any of the cases where conductive high-order cobalt oxide powder was formed on the surface of nickel hydroxide, and high-order cobalt oxide or nickel powder was mixed in the paste as the conductive material, as the method of adding cobalt powder as in Example 1.

It should be noted that the effects of the present invention can be also achieved in cases where cobalt oxide of higher order and nickel powder are admixed with each other in an appropriate amount, and not limited to the cases where each conductive agent is solely used.

Although not shown in this Example, it was ascertained that the present invention would be also applicable in any of various electrode supports according to the present invention shown in Example 1.

EXAMPLE 3

In this Example, the hydrogen-absorption alloy negative electrode of a cylindrical sealed nickel-hydrogen storage battery produced using the electrode support shown in Example 1 was examined. The perforated metal sheet c in Table 1 was selected for the electrode support. The processed metal sheet c having the apparent thickness of 500 $\mu$m was preliminarily passed through a roll press with a gap of 300 $\mu$m thereby to reduce the apparent thickness thereof to 300 $\mu$m.

A negative electrode was prepared using this perforated metal sheet. Carbon powder as a conductive agent and a binder of styrene-butadiene were added to alloy powder of the composition of $MmNi_{3.6}Mn_{0.4}Al_{0.3}Co_{0.7}$ hydrogen-absorption alloy of $AB_5$ type, kneaded with water into a paste, which was coated on the perforated metal sheet c of which apparent thickness had been reduced to 300 $\mu$m. The perforated metal sheet was then dried, compressed, and cut into prescribed dimensions to obtain an electrode v according to the present invention.

As a comparative example, an electrode w was produced as a prior art electrode by using a core material of normal punched metal such as the one used in metal sheet g in Table 1 having a thickness of 50 $\mu$m.

Sealed batteries were prepared using these two kinds of negative electrodes. Positive electrodes employed in these batteries were obtained by mixing a well-known spherical nickel hydroxide powder with additives such as zinc oxide, cobalt oxide, or cobalt hydroxide into a paste, filling this paste in a sponge-like nickel conductive porous material, drying, compressing, and cutting into prescribed dimensions. For the separator, an unwoven fabric of sulfonated polypropylene having a thickness of 0.12 mm was used. These positive electrode and negative electrode were wound in a spiral with the separator interposed therebetween, and accommodated in an outer metal case of nickel-plated iron. Positive and negative electrodes are connected by electric welding to respective current collecting lead plates, thereby being connected to positive electrode terminal and negative electrode terminal, respectively.

An aqueous solution of potassium hydroxide of 1.3 specific gravity dissolved with lithium hydroxide 40 g/l was poured into the battery as the electrolyte, after which the outer metal case was crimped with a sealing cap thereby finishing a sealed battery. The battery is a cylindrical sealed battery of size C with a nominal capacity of 2.8 Ah.

Hereinafter the battery using the electrode v of the present invention will be referred to as battery V, whereas the battery with the prior art electrode w as battery W.

The characteristics of these batteries were examined, and in particular, they were compared with respect to the high-rate discharge characteristic and cycle life characteristic. First, the batteries were charged for 15 hours at 0.1C. at 20° C., and then left for one hour and thereafter discharged at 0.2C. until the battery voltage decreased to 1.0V. Three cycles of this test were repeated under the same conditions. Next, under similar charging conditions, the fourth-cycle test was conducted with a discharge current of 5C., and the fifth-cycle test was conducted with a discharge current of 10C., to compare the high-rate discharge characteristics.

Also, for the sixth and subsequent cycles, the cycle life test was conducted by charging at 0.5C. for 2.5 hours and discharging at 0.5C. until the battery voltage decreased to 1V to compare the structure of the negative electrode and the cycle life characteristics. The results are shown in Table 4.

According to the evaluation of these characteristics, all of the batteries exhibited favorable battery characteristics until the third cycle and they all satisfied the nominal capacity. The results of performance evaluation in the high-rate discharge characteristic test are indicated by the discharge voltage (intermediate voltage) and the utilization rate. The number of cycles in cycle life test is shown by the number of cycles at which the discharge capacity of the battery has reached 70% or lower of the initial capacity.

TABLE 4

| | High-rate discharge characteristic test | | |
|---|---|---|---|
| | 5C Discharge | 10C Discharge | Cycle life test |
| Battery V | 1.18 V, 87% | 1.14 V, 83% | 650 cycles |
| Battery W | 1.16 V, 74% | 1.11 V, 68% | 480 cycles |

As can be seen from Table 4, it was ascertained that the battery V according to the present invention had superior performance both in high-rate discharge characteristic and cycle life characteristic, in comparison with the battery W of the prior art. These differences in performance shown in Table 4 were caused solely by employing different electrode supports in the negative electrode when constituting the battery. The high-rate discharge characteristic and cycle life characteristic can be thus remarkably enhanced by using the electrode support of the present invention in the negative electrode, too.

As described above, with the present invention, in comparison with flat punched metal used as an electrode support of a coated-type nickel electrode, the battery characteristics can be improved. Further, the electrode according to the present invention can be produced at lower cost than those electrodes with a three-dimensionally foamed porous nickel substrate or fabric-type nickel processed into felt. The electrode cost can thus be reduced. Furthermore, the present invention is obviously applicable not only to the coated-type nickel electrode and hydrogen-absorption alloy electrode described above with reference to the embodiments but also to other coated-type electrodes including a zinc electrode and a cadmium electrode, or to positive and negative electrodes of non-aqueous electrolyte batteries such as lithium-ion storage battery and lithium-polymer storage battery.

Industrial Applicability

The adhesion between the active material layer and the electrode support of an electrode for secondary batteries using a metal sheet can be improved by forming minute surface irregularities thereby to provide a three-dimensional structure in the metal sheet by a mechanical method. As a result, remarkable improvements in battery characteristics can be achieved, such as enhancement of the utilization of active material, improvement in the high-rate discharge characteristic, and elongation of electrode life. Moreover, the electrode support according to the present invention can be fabricated by a simple mechanical method at a far lower cost in comparison with foamed metal-type electrodes. The present invention is thus of high industrial value.

What is claimed is:

1. A non-sintered type electrode comprising an electrode support made of a metal sheet having minute surface irregularities on which is coated or pressed an active material for battery or an active material retaining medium,
    said surface irregularities are formed by a mechanical method such that protrusions and indentations are configured with a center-to-center pitch (P) in the range of from 50 to 300 $\mu$m, and such that the apparent thickness of the electrode support after forming the surface irregularities is at least three times as large as the thickness before the formation of the surface irregularities.

2. The non-sintered type electrode according to claim 1, wherein each of the protrusions and indentations is formed in a substantially tapered shape.

3. The non-sintered type electrode according to claim 1, wherein each of the protrusions and indentations is formed in a substantially conical shape.

4. The non-sintered type electrode according to claim 1, wherein the apparent thickness of the electrode support after forming the surface irregularities is at least five times as large as the thickness before the formation of the surface irregularities.

5. The non-sintered type electrode according to claim 1, wherein the electrode support is constructed of a punched metal of which material thickness before the formation of the surface irregularities is in the range of from 10 to 80 $\mu$m.

6. The non-sintered type electrode according to claim 1, wherein the electrode support is constructed of a non-punched metal sheet of which material thickness before the formation of the surface irregularities is in the range of from 10 to 80 $\mu$m.

7. The non-sintered type electrode according to claim 1, wherein the metal sheet with the surface irregularities has innumerable minute holes formed by piercing through the tops of the protrusions.

8. The non-sintered type electrode according to claim 1, wherein the center-to-center pitch (P) of the protrusions and indentations is in the range of from 100 to 200 $\mu$m.

9. The non-sintered type electrode according to claim 1, wherein the apparent thickness of the electrode support is more than 400 $\mu$m.

10. The non-sintered type electrode according to claim 1, wherein the electrode support is constructed of any one of steel sheet, nickel-plated steel sheet, and nickel sheet.

11. The non-sintered type electrode according to claim 1, wherein the protrusions and indentations of the surface irregularities are formed at random with the respective numbers of protrusions and indentations in ranges of from 80 to 20% and from 20 to 80% per unit area.

12. The non-sintered type electrode according to claim 1, wherein the protrusions and indentations of the surface irregularities are formed in order such that the protrusions and indentations are arranged alternately in one direction.

13. The non-sintered type electrode according to claim 1, wherein the protrusions and indentations of the surface irregularities are formed in order such that the protrusions and indentations are arranged alternately in both longitudinal and transverse directions.

14. The non-sintered type electrode according to claim 1 for use as a nickel positive electrode of an alkaline storage battery, wherein the active material comprises nickel hydroxide powder of which surface is coated with cobalt oxide of higher order at the rate of from 2 to 10 wt % in relation to 100 wt % of nickel hydroxide.

15. The non-sintered type electrode according to claim 1 for use as a nickel positive electrode of an alkaline storage battery, wherein the active material comprises nickel hydroxide powder in which is contained at least cobalt oxide of higher order or nickel in such a way as to contact the nickel hydroxide powder.

16. The non-sintered type electrode according to claim 15, wherein the cobalt oxide of higher order is solely contained at the rate of from 2 to 10 wt % in relation to 100 wt % of nickel hydroxide.

17. The non-sintered type electrode according to claim 15, wherein the nickel is solely contained at the rate of from 10 to 25 wt % in relation to 100 wt % of nickel hydroxide.

18. The non-sintered type electrode according to claim 1 for use as a hydrogen-absorption alloy negative electrode of an alkaline storage battery, wherein the active material retaining medium comprises hydrogen-absorption alloy powder of which surface is in contact with a conductive agent selected from the group consisting of nickel, copper, and carbon, the conductive agent being contained at the rate of from 0.5 to 10 wt % in relation to 100 wt % of hydrogen-absorption alloy powder.

19. A method of manufacturing a non-sintered type electrode comprising forming minute irregularities on the surface of a metal sheet by press-machining using metal molds such that protrusions and indentations are configured with a center-to-center pitch (P) in the range of from 50 to 300 $\mu$m and such that the apparent thickness of the metal sheet after forming the surface irregularities is at least three times as large as the thickness before the formation of the surface irregularities, thereby fabricating an electrode support, and an active material for battery or an active material retaining medium is coated or pressed on the surface of the thus obtained electrode support.

20. The method of manufacturing a non-sintered type electrode according to claim 19, wherein in the process of press-machining the metal sheet with metal molds, minute holes are formed simultaneously with the formation of the surface irregularities by piercing through the tops of the protrusions.

21. The method of manufacturing a non-sintered type electrode according to claim 19, wherein each of the protrusions and indentations is formed in a substantially tapered shape.

* * * * *